United States Patent [19]

Rudolph et al.

[11] Patent Number: 5,657,396

[45] Date of Patent: Aug. 12, 1997

[54] METHOD AND APPARATUS FOR PATTERN RECOGNITION AND VALIDATION, ESPECIALLY FOR HAND-WRITTEN SIGNATURES

[75] Inventors: Volker Rudolph, St. Maergen; Werner Ruppert, Schoenaich, both of Germany

[73] Assignee: International Business Machines Corporation, Armonk, N.Y.

[21] Appl. No.: 486,470

[22] Filed: Aug. 16, 1995

Related U.S. Application Data

[62] Division of Ser. No. 55,441, Apr. 30, 1993, abandoned.

[30] Foreign Application Priority Data

Apr. 30, 1992 [DE] Germany ................ 0/92107378.9

[51] Int. Cl.$^6$ ........................................... G06K 9/00
[52] U.S. Cl. ................................. 382/190; 382/187
[58] Field of Search ........................... 382/119, 187,
382/192, 197, 203, 209, 218, 224, 227,
123, 153, 242, 116, 181, 186, 188, 189,
190, 193, 194, 195, 198, 199, 200, 201,
202, 204, 205, 217, 229, 289, 290, 296;
358/505, 401; 902/3

[56] References Cited

U.S. PATENT DOCUMENTS 4,545,067 10/1985 Juvin et al. ...................... 382/21
4,680,801 7/1987 Etherington et al. ............... 382/3

FOREIGN PATENT DOCUMENTS 2-25985 1/1990 Japan ..................... G06F 15/62

*Primary Examiner*—Andrew Johns
*Assistant Examiner*—Bijan Tadayon
*Attorney, Agent, or Firm*—Kenneth A. Seaman

[57] ABSTRACT

Apparatus and method for pattern recognition and validation, especially of hand-written signatures. Original files of basic structures are established and stored in a reference image file. The structure to be verified is analyzed in the same way and with the same methods to find their significant basic structures. Information stored in the reference image file and information found as significant basic structures are compared. This comparison is performed in the order of significance sequentially or parallel for at least for some information entities. Validation is performed for each single comparison step and the results are weighted. If no clear result (either a match with a given confidence or a non-match is delivered) is obtained, a stepwise refinement of the recognition structures is performed by repeating the recognition and validation procedure, on a higher level of information, or with other words with finer details to be analyzed.

7 Claims, 8 Drawing Sheets

INDEX-SHIFT OF ANGLE
↓
Y
POSITION-SHIFT ⟶ X
POLAR DENSITY VECTOR

FUNCTION TYPE:

$$\frac{1}{1+e^{-x}}$$

FIG. 5A
SHIFT 0
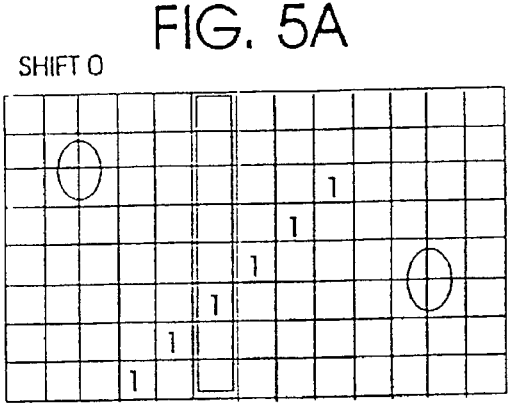
0 0 0 1 1 1 1 1 1 0 0 0 0
FIG. 5B
SHIFT 1
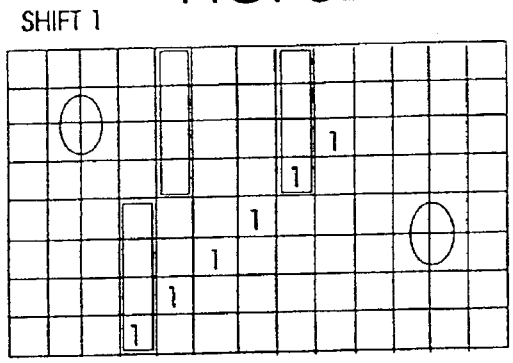
0 0 0 1 1 1 2 1 0 0 0 0
FIG. 5C
SHIFT 3
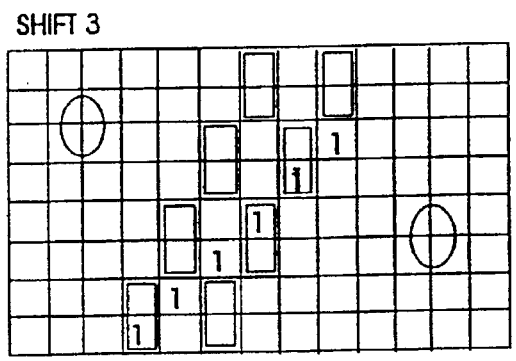
0 0 0 1 2 2 1 0 0 0 0 0
FIG. 5D
SHIFT 7
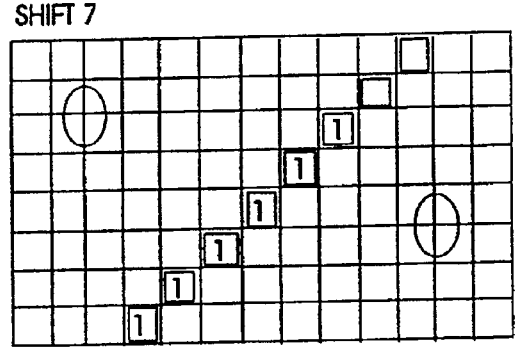
0 0 0 6 0 0 0 0 0 0 0 0
FIG. 5E
```
0 0 0 1 1 1 1 1 1 0 0 0 0   SHIFT 0
0 0 0 1 1 1 2 1 1 0 0 0 0   SHIFT 1
-----------------------------
0 0 0 1 2 2 1 0 0 0 0 0     SHIFT 3
-----------------------------
-----------------------------
0 0 0 6 0 0 0 0 0 0 0 0     SHIFT 7
-----------------------------
```
FIG. 5F
0 0 0 6 0 0 0 0 0 0 0 0   LENGTH-VECTOR
0 0 0 7 0 0 0 0 0 0 0 0   ANGLE-VECTOR

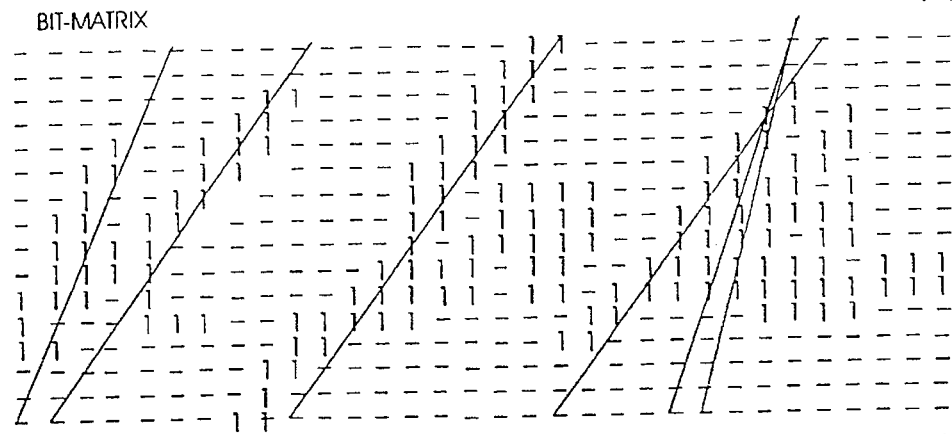
FIG. 8A
FIG. 8B
POLAR-LENGTH-VECTOR
14 10 — — — — — —13 — — — — — — —11 — — 9 9 — — — — — — — —
FIG. 8C
POLAR-ANGLE-VECTOR
5 9 — — — — — — 9 — — — — — — — — 9 — — — 4 3 — — — — — — — —
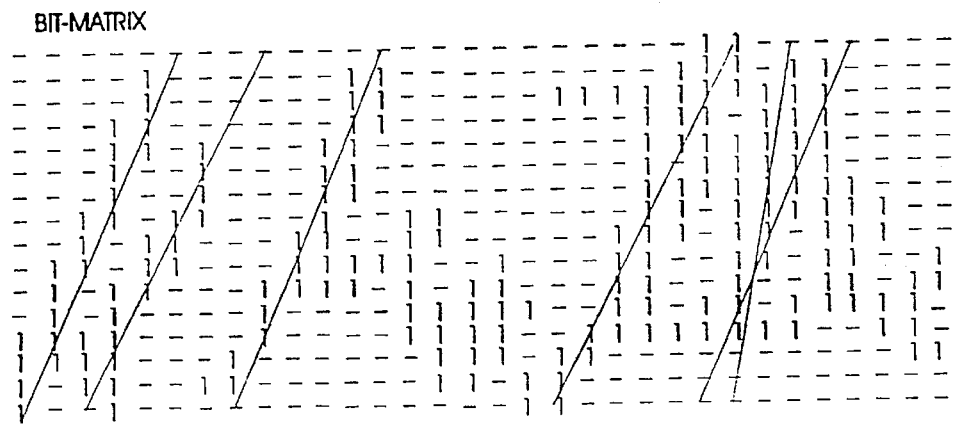
FIG. 9A
FIG. 9B
POLAR-LENGTH-VECTOR
— — — —14— — — — — — — — — 14 — — — —1111 — — — — — —
FIG. 9C
POLAR-ANGLE-VECTOR
5—4 — — — — 5— — — — — — — — — — 6 — — — 5 2 — — — — — — — —

FIG. 10A
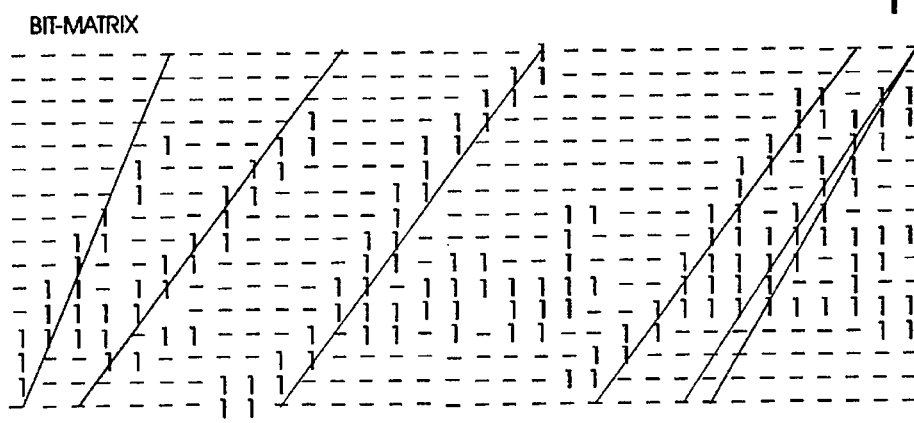
FIG. 10B
POLAR-LENGTH-VECTOR
14 - 9 - - - - - -13 - - - - - - - - -13 - -1010- - - - - - -
FIG. 10C
POLAR-ANGLE-VECTOR
5 - 9 - - - - - - 9 - - - - - - - - - 9 - - 8 7 - - - - - - -
FIG. 11A
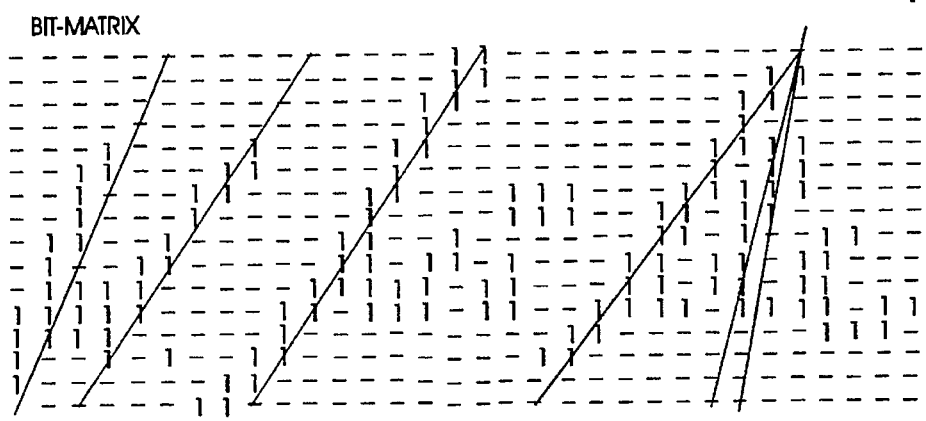
FIG. 11B
POLAR-LENGTH-VECTOR
14 -10- - - - -15- - - - - - - 13 - - - - 8 8 - - - - - -
FIG. 11C
POLAR-ANGLE-VECTOR
5 - 8 - - - - - 8 - - - - - - - - - 9 - - - - 3 1 - - - - - -

5,657,396

METHOD AND APPARATUS FOR PATTERN RECOGNITION AND VALIDATION, ESPECIALLY FOR HAND-WRITTEN SIGNATURES

The present application is a division of prior patent application Ser. No. 08/055,441, filed Apr. 30, 1993, now abandoned.

BACKGROUND OF THE INVENTION

The invention pertains to a method for pattern recognition and validation, especially of hand-written signatures, said are written remote from the place of recognition and validation, using a computer system. The invention furthermore pertains to an arrangement for performing this method as well as to the use of the method and the arrangement in a signature verification environment such as preferably in the banking area.

In U.S. Pat. No. 4,028,674 a signature verification where an image mosaic for a signature to be verified is stored in a memory and wherein a prototype feature set for said signature is stored in a memory, is described. Binary signals representative of the location and magnitude of positive and negative peaks in mosaic and the stroke character in the region of each of said peaks are generated. A two-dimensional feature set pattern after the prototype set is stored with the signals ordered in dependance upon the occurrence of the peaks in the signature and accompanied by peak rank in terms of peak magnitude and stroke character in the vicinity of each peak. The feature vector set is then compared with the prototype vector set and identity is signalled when within predetermined limits the feature set matches the prototype set.

U.S. Pat. No. 4,286,255 describes a method and apparatus for determining whether a newly-signed signature and previously recorded signature were made by the same person. The method and apparatus include the steps of an apparatus for scanning a document containing the newly-signed signature to provide an electrical signal representative of the reflectivity of the newly-signed signature and the document and generating a signature envelope derived from the electrical signal with the plurality of characteristics of the newly-signed signature are then calculated based on the location and magnitude of the selected points forming the signature envelope with respect to a reference line. The calculated characteristics of the newly-signed signature are then compared with corresponding characteristics of a standard signature formed from a group of previously recorded signatures and a signature verification decision is generated based on the degree with which the compared characteristics match.

From the co-pending European application EP 90 120 620.1 (IBM Docket GE 990 010) of the present applicant, a method of automatically verifying a signature of an individual with a computer is described. In this known method a digitized image with a number of picture elements is established from the signature to be verified. Parameter values to be verified are calculated from this digitized image and are compared with corresponding reference parameter values that were calculated and stored previously. Depending on a comparison of the reference parameter values and the parameter values to be verified, it is decided if the signature to be verified is true or false. Various possibilities are described in this pending application for the calculation of significant parameters. The gravity-center of all densities of all rows and all columns of the digitized image is a parameter which can be used for a preselection. Centers-of-gravity, gravity-lines, maximum values and maximum lines, etc. are further significant parameters. Parameters with a very high reliability can be generated by calculating second order polynomials which describe segments of the signature.

The general problem underlying signature verification or more generally spoken, pattern recognition and validation pertains to the fact that an image typically has a very high amount of information. Analyzing all the information is very time-consuming and at least may lead to confusion at most cases information which are of no or minor interests. But this information which is of no interests makes very often identification of the important information very difficult. Under statistical considerations in many cases the distribution is so wide that the desired information cannot be detected.

SUMMARY OF THE INVENTION

It is an advantageous effect of the present invention to provide a solution to the question how to find in a very short time the important information out of such an image. The invention as laid down in the independent claims basically solve this object. In solving this problem to identify the essential information the following basic road is used: analyzing sequentially in a predefined way the important structures, comparing them with a set of basic structures, and qualifying the extracted information.

Further advantageous embodiments and developments of the basic solutions of the invention are laid down in the respective sub-claims. Advantages are either self-explanatory or explained later-on in the more specific description of the embodiments of the present invention.

BRIEF DESCRIPTION OF THE DRAWINGS

The invention is described subsequently in more detail in connection with the embodiments shown in the drawing in which:

FIGS. 5A through 5F show different states during the shifting procedure, the different vector built, the position-shifted-polar-matrix and also the length and angle vector;

FIG. 8 shows in FIG. 8A another example of a bit matrix of a similar but not equal signature of the same person of FIG. 6, in FIG. 8B the pertaining polar-length-vector and in FIG. 8C the pertaining polar-angle-vector;

FIG. 9 shows a further example of a signature of the same person, similar to that of FIG. 6 with the bit matrix in FIG.

Figures 6, 6A, 6B:
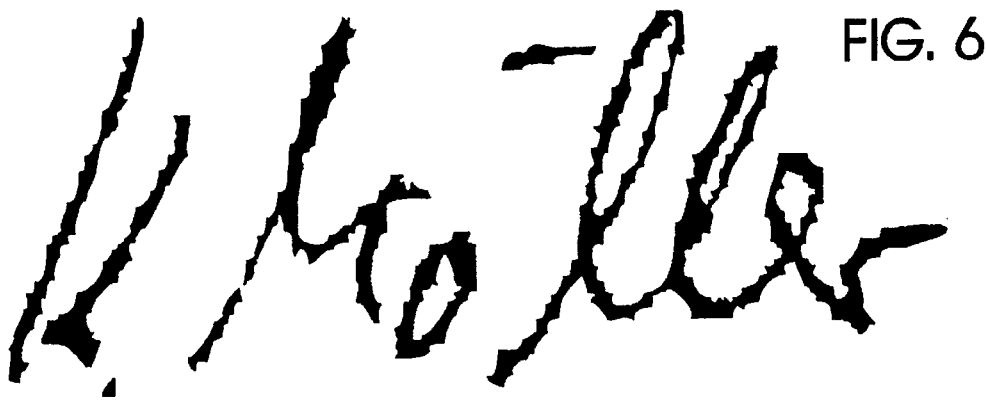
FIG. 6 shows a signature of a "K Möller"
FIG. 6A shows a density matrix of a signature similar to that of FIG. 6.
FIG. 6B shows the bit matrix built out of the density matrix of FIG. 6A.
Figure 12:
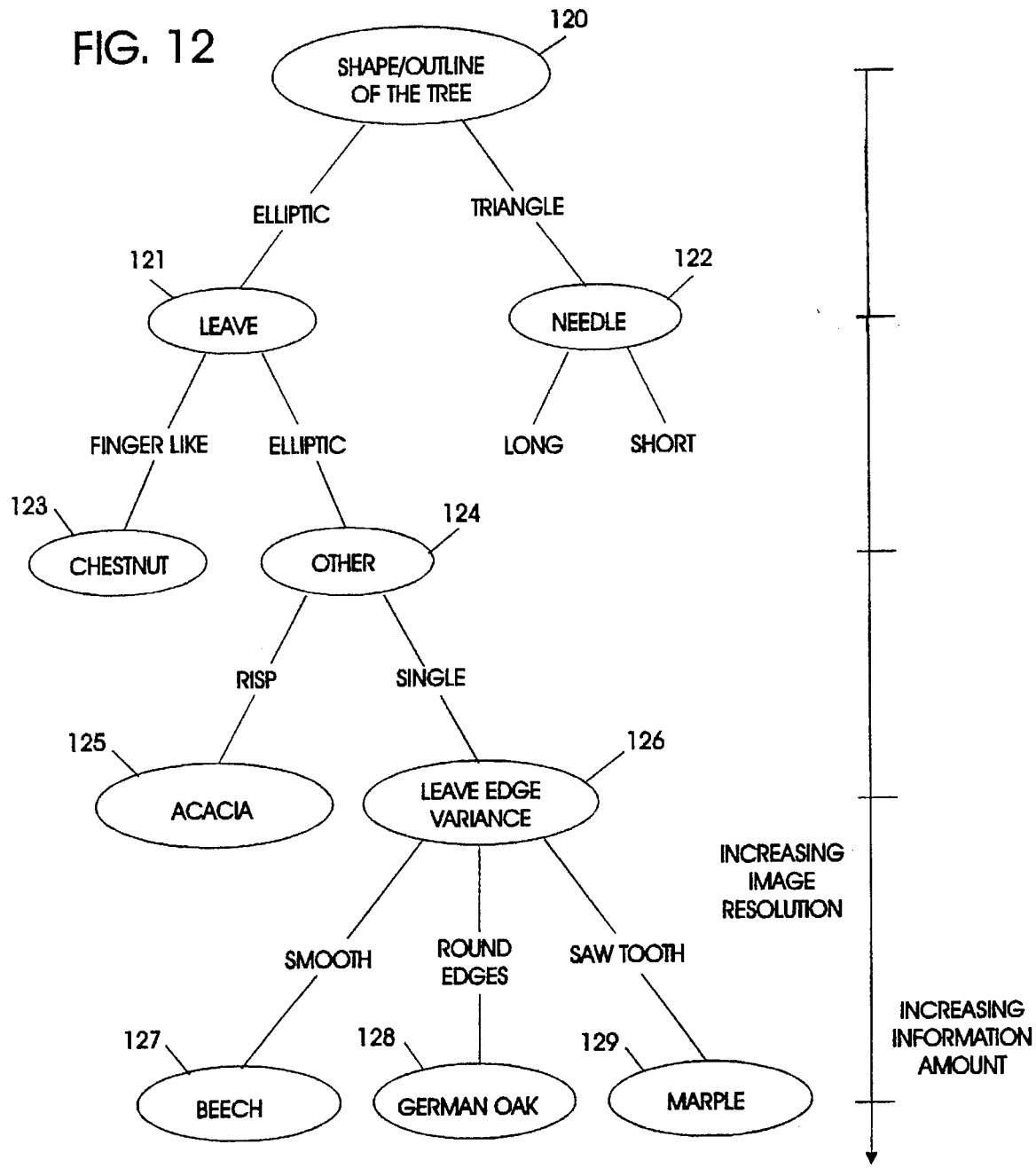

9A, the pertaining polar-length-vector in FIG. 9B, and the pertaining polar-angle-vector in FIG. 9C;

FIG. 10 shows another example of a signature of the same person, similar to that of FIG. 6 with the bit, matrix in FIG. 10A, the pertaining polar-length-vector in FIG. 10B, and the pertaining polar-angle-vector in FIG. 10C;

FIG. 11 shows a still further example of a signature of the same person, similar to that of FIG. 6 with the bit matrix in FIG. 11A, the pertaining polar-length-vector in FIG. 11B, and the pertaining polar-angle-vector in FIG. 11C; and FIG. 12 shows as an example of a decision tree using images and shapes of different trees.

DESCRIPTION OF THE PREFERRED EMBODIMENT

An image of a pattern has usually a lot of different information. This information, for example, can be line-art structures of regular or irregular form, it can be shapes and their arrangement, it may be defined by black and white and/or color areas, it may be letters or characters, it may be hand-written, it may be endorsements, it may be symbolic or it may be of other kind.

In many cases a certain kind of information can be considered separately by suppressing other information. Such a certain information is analyzed by using a sequence of detailed information in comparing with a set of basic information. The result of the compare is ranked by priorities and is weighted.

For example, by analyzing the type of a tree with the help of detection of the baste shape.

Figure 1A:
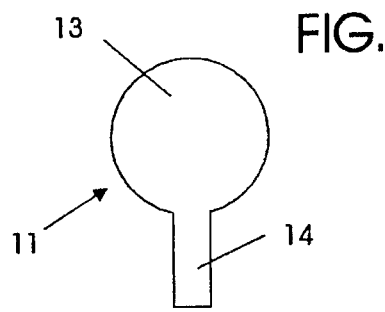
FIG. 1 shows two basic shapes of two different trees.
Figure 1B:
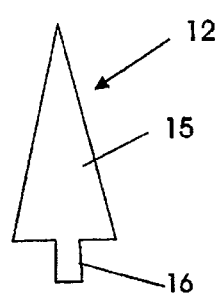

In FIG. 1 there is shown the basic shape of a leaf-tree 11 and the basic shape of a needle-tree 12. The leaf-tree 11 is characterized by an elliptic portion 13 above a stem 14. The basic shape of needle-tree 12 is formed by a triangle portion. Beside the characteristic difference of the elliptic and triangle shaped upper portions 13 and 15 there is also a difference in the length of the two different stems 14 and 16, In analyzing an image of a pattern as, for example, shown in FIG. 1, the basic outer shapes of the two patterns of leaf-tree 11 and needle-tree 12 are tried to detect first. This is the most important information for which first is looked out. If there is a match with the shape of a leaf-tree, then the next step is to compare the shape of the leafs with those of a leaf library. If, for example, still a higher level of confidence is desired, the wood structure could be used in analyzing the patterns by comparing this wood structure with wood structure information taken from a library. If the level of confidence is high enough the analyzing process is stopped. In connection with a decision tree schematically shown FIG. 12, this example is described in more detail in the following:

In step 120 of FIG. 12 there is a start-point indicated for finding the shape/outline of the tree to be found. From step 120 it branches either to elliptic or triangle form of the outline. Elliptic leads to step 121, where the leaf form is going to be found. The other branch triangle leads to step 122 in which the needle form is to be distinguished. This needle form might be a long needle or a short needle. This branch of the decision tree is not further followed on in the shown example. The leaf-form to be distinguished in step 121 might be finger-like or elliptic. Is it finger-like, it may lead in step 123 to find out that the tree to be searched is e.g. a chestnut. This then is the final result. If the leaf-form is elliptic, in step 124 other distinguishing information has to be followed. There might now be distinguished between risp-form or elliptic leafs or single leafs. In case of a risp-form, in step 125 the acacia is found and the decision tree ends there in this branch. If on the other hand the single leaf-form is followed, there might be different leaf-edge variances followed from step a beech tree in step 127. If the leaf is single and has round edges, it may end in the German oak tree in step 128. If the single elliptic leaf has a outer form of a sawtooth, then it may end in the maple tree in step 129.

This decision tree shows in an example more general principles to be followed. In step 120 we have a low resolution in the edge detection method which, for example, is comparable with the angle distribution of lines. On the level of steps 121 and 122 we have a medium resolution or a zooming of the smaller contiguous objects. On the level of steps 123 and 124, we have a higher resolution and already an object relationship. On the level of steps 125 and 126 there is a very high resolution given and the objects are found by the edge shape of smaller objects. Compared to the step 120 in low resolution we have a detection of the whole object and on the level of steps 125 and 126 there is edge shape recognition of smaller objects, i.e. the leafs themselves.

In connection with FIG. 12 it generally can be said that decision tree levels refer to related databanks with reference images or files. Every decision tree step is related to a finer resolution or generally speaking to a finer and higher amount of information. The level of detail increases drastically from step to step and with that also the effort necessary for the recognition increases drastically.

One of the basic advantages of the present invention is that only in worst cases the whole decision tree has to be taken into consideration. In best cases, see for example the chestnut tree in step 123 of FIG. 11, only few steps are necessary to find the wanted result. Another important advantage is that in case of an early firm decision much more further details could lead to confusion. The application of the present invention is possible for the recognition of characters be it optical character recognition, be it intelligent character recognition. It signatures, as well as to recognize two-dimensional or three-dimensional objects and to recognize even faces and humans.

Generally speaking, basic sets of information is used to analyze the actual information. In this a most important fact is that what is called basic information has very few data. This data on the other hand is essential. If one considers this fact in a mathematical way, it can be considered as senseful predefined cuts in an n-dimensional information room to describe the desired information. As more cuts are available, as better is the information. But very often only a few information is sufficient.

In order to get high efficiency in analyzing the information, which is an important object of the present invention, it is important to use only those sets of basic information in the optimal sequential priority which give the right answer in the shortest time. It is not necessary that the sets of basic information are used completely. How many of such basic information is used depends on the desired accuracy or with other words depends on the needed level of confidence. It also depends on the application and the kind of questioning.

Figure 2A:
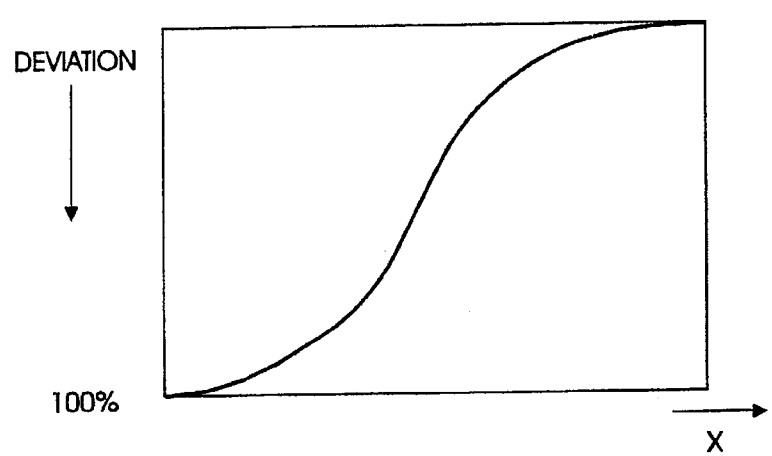
FIGS. 2A and 2B show two different validation functions for the true-false decision.
Figure 2B:
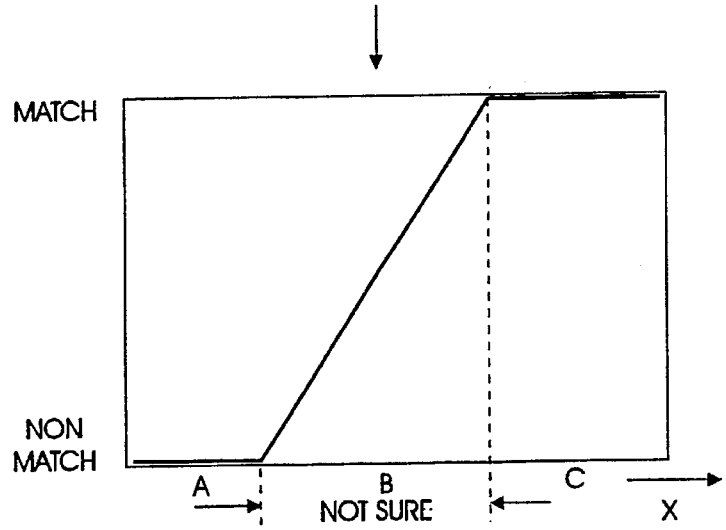

In FIG. 2A there is shown a deviation function of the type $1/1+e^{-x}$. The deviation is shown over the X-axis and in a way that the deviation becomes smaller with increasing value of x. In FIG. 2B this function is shown in a schematically form such that there exist above the X-axis an area A where one says with certainty that there is a non-match, an area C were one could say that a match occurs and a linearized transition area B were the decision is not sure.

As shown in connection with the match and non-match representation given in FIG. 2B, and including a not sure area, this shows that in comparing selected information with the input is true, respectively if it matches, or if the output result is false, respectively does not match or if the output is not sure.

In the comparison the true-false condition is used to define the procedure of analyzing the information. If the comparison with the basic information of highest priority leads to false then the answer is that the object or the partial information respectively cannot be identified by the basic information set. That means, that the question if this information matches with a stored information, that for such a type of object the question of matching must be denied. In case of not sure further comparisons with other basic structures may be done. Those other basic structures then have a lower priority than the preceding ones. In case of a match or the answer true respectively, the information is true with a certain possibility and a certain failure. If the possibility is high enough or with other words if the pre-set level of confidence is reached, no further compares are necessary. If on the other hand the probability is not high enough, further comparisons with other basic information have to be performed.

In connection with FIG. 3 the overall scheme for the analyzing method in accordance with the present invention as well as the scheme for analyzing per each decision step used in the stepwise refinement scheme of the present invention will be described. The actual image of the pattern to be recognized and validated is scanned by an image scanner 31. This image scanner 31 delivers a pixel array to an image normalizer 32. Generally speaking, in this image nor realizer 32 the scanned image is bought to a format in height and width that is equal for all patterns to be recognized. By three indicated pattern identificators 33, 34 and 35 different significant basic structures of the normalized image is extracted. This significant basic structure information preferably is outputted in bit strings to pattern comparators 36, 37 and 38. These number equal to the indicated pattern identificators 33, 34 and 35. The significant basic structures outputted from pattern identificators 33, 34 and 35 to the pattern comparators 36 or 37 or 38 respectively are compared there with stored information strings delivered from a file 39 storing generally speaking the characteristic parameters of a reference image with which the actual image is compared. The outputs of the pattern comparators 38, 37 and 38 are input to a weighting net 301 in which the contribution of each pattern comparator is provided with a certain weight. This reflects the priority or in other words the level of confidence of each contribution. The result of this is output on output line 302. Dependent on this weighting process and the result, the afore-mentioned true, false, or not sure decision is given. In case of not sure, one or more further steps of recognition and validation may be performed for the same actual image using significant basic structures of finer or higher resolution value. These steps then follow per decision step the same procedure as generally indicated above in connection with description of FIG. 3.

In the co-pending European patent application EP 90 120 620.1 (IBM Docket GE 990 010), filed 20th Oct. 1990, of the present applicant, there are described various possibilities for the calculation of significant parameters. For example, gravity center lines are determined for different rows and different columns, as well as center of gravities. For further details, reference is made to this application.

In accordance with the present invention in the following example of an embodiment of the invention the angle structures of lines is described. One basic characteristic of a hand-written image, for example of a signature, is the predominant angle structure of the lines and the distribution around the image or along the direction of writing respectively. In the following there will be described how in accordance with the present invention straight lines and their every image of a pattern, like a hand-written text, in the form of a word or signature, has a predominant axis. This is normally the "horizontal" axis in the direction of writing. Furthermore, there is a predominant angle for the lines arranged usually vertical or close to vertical in respect to the writing axis. This so-call "vertical" axis needs not to be arranged in a right angle to the writing axis or the "horizontal" axis.

For a common processing in pattern recognition and validation normalizing is advisable. For the normalization purpose the horizontal axis of the digital image to be processed is set to the principle axis of writing direction and the angle for the "vertical" lines is measured relative to this axis. Thus, the predominant angle is determined. Furthermore, in normalization the image of the pattern is set to a common format with respect to width and height. This might include an enlargement or a reduction of size of the pattern to be recognized.

In the example of signature recognition and after finding the predominant angle of the straight lines arranged essentially "vertical", the whole image is erected by shifting the image matrix in a direction opposite to the angle direction of the predominant straight lines. This shifting is performed by the same angle as the predominant angle. Thus, the image is erected.

In total, all the columns of the image built a histogram that is significant for a signature after normalization in image height and width. The significant parameters that can be taken from that are the absolute and relative distances between peaks in the histogram, the absolute and relative peak values, the shape or outer envelope of the histogram, and the absolute and relative length of the lines in the peak positions.

A histogram is th presentation of the integral of the density of an image referring to one axis. The histogram of a raster image with regard to the X-axis means the sum of the density per column i. For $1 \leq i \leq n$, $1 \leq j \leq m$, j being the image row and m the total number of rows, the following formula is valid:

$$h_x = \sum_{j=1}^{m} density_{xy}.$$

In an index shifted histogram, the density values are summed up in a more complex way. For this more complex way the following general formula is valid:

$$h_x = \sum_{j=1}^{m} density_{ij},$$

whereby i=f(x, y) and j=g(x, y) is, and f and g are complex functions that might be coupled.

Out of this index shifted histogram, a special case is the linear index shifted histogram. For $shifts_{min} \leq k \leq shift_{max}$, whereby k is the number of shifts and for M=m/(k+1), the following formula is valid:

$$\sum_{j=1}^{M-1} \text{density}_{(x+1)j} + \ldots + \sum_{j=M}^{2M-1} \text{density}_{(x+k)j} = \sum_{j=k \cdot M}^{m \cdot h_x} \text{density}_{xj} +$$

This formula allows the calculation under which angle the predominant blackness of the image occurs.

With the help of this technique a linear index shifted density matrix can be realized. The realization can be done mechanically by rotating an aperture stepwise, shifting the aperture stepwise across the image. Instead of rotating an aperture a linear scan-array can be rotated with the help of a program. This leads to the same result as the mechanical rotation. It is also possible to combine both methods.

From the above defined density matrix a bit matrix is derived. This is performed by setting all density values of the bit matrix to a "1" if the density is greater than a predefined offset or threshold value respectively. All other values are set to "0".

Figure 4:
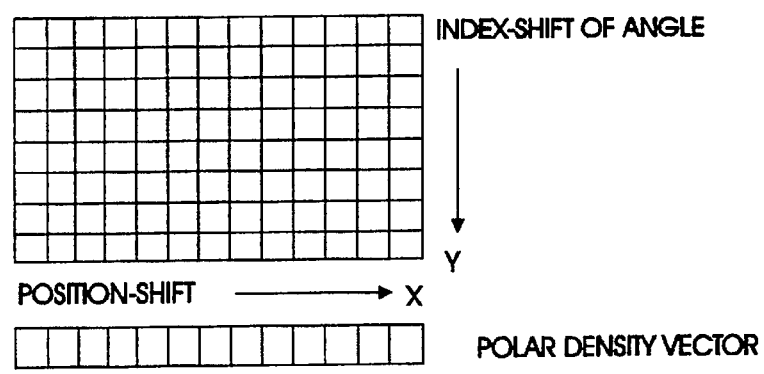
FIG. 4 shows schematically a position-shifted-polar-matrix and a polar density vector.

In connection with FIG. 4 the index-shift of angle and the position-shift will be described. In accordance with the present invention the rotating of the "aperture" on a fixed point and the counting of the density for each step of rotation leads to an absolute maximum of the sum of density. This is defined and named as a polar maximum. A table winch shows as well the density values for each index-shift in "angle" as well as in position is called a "position-shifted-polar-matrix". The index-shift of angle is performed stepwise along the indicated y-direction and the position-shift is done stepwise along the orientation line indicated by the arrow in x-direction. Finding the maximum within a column of this matrix leads to the polar maximum for the fixed position which is defined by the corresponding column.

Considering the density matrix all polar maxima build a vector of the length of the image, named the polar-density-vector. Considering the bit-matrix all polar-maxima build the polar-bit-vector.

This polar-bit-vector contains the information about how many lines of maximal length are detected, how the length of these lines is, how their angles are, and what their these lines is unequal with the density. Furthermore, for detailed processing also gaps in the vector have to be taken into consideration. If the polar-bit-matrix contains only a single line or if the line of maximal length is considered to be the polar-bit-vector then this vector is named polar-length-vector. This vector describes the maximum vector of each position referring to the reference axis.

The value of angle-shift where the polar-vector exists, is named the angle-vector. This angle-vector describes the angle of the polar-maxima and the position with reference to the reference axis.

For finding the start-point of a line, a third vector, which contains this start position, is created and called the start-vector.

The length-vector, the angle-vector, and the start-vector describe uniquely the position of the line with the greatest length. The following example shows how to detect the polar-maximum for one line in using linear-index-shift and using as reference the x-axis. The calculation comprises the following steps:

1. create bit-matrix: if density$_{y, x}$>threshold pixel-matrix [y], [x]=1 else pixel-matrix [y], [x]=0
2. sum up all values of the pixel-matrix within each columns, 3. sum up all values of the pixel-matrix within the shifted columns,
4. search the length-vector and the angle-vector by finding the maxima in the position-shifted-polar-matrix.

This example is shown in connection with FIG. 5. In FIG. 5A there is shown an example of one line represented by the representation of a slanted chain of "1". All other points in the matrix equal "0". In shift "0" shown in FIG. 5A all "1" are added which occur in the columns. Underneath the table there is shown a line containing a chain of "0" and "1" showing the result of this summing-up. FIG. 5B shows the stage of shift "1" indicated by the rectangulars in the table. In summing-up in column 7 from the left starting and then jumping to the "1" encompassed by the shifted rectangular shows a result of two in the bottom line polar-density-bit-vector. FIG. 5C shows shift 3 and the pertaining result showing in column 5 and 6 a result of two each. Finally in FIG. 5D in shift 7 in column 4 from the left the result is a six as polar-density-bit-vector.

In FIG. 5E all vectors of shift 0 to shift 7 are put together in building the position-shifted-polar-matrix. Only the lines pertaining to shift 0, shift 1, shift 3, and shift 7, are filled with zeros and numbers. The maxima in the columns give the final result for the length vector with six and the angle vector with seven, because in shift 7 this maximum length vector of six occurs. This is shown in FIG. 5F.

The example shown in FIG. 5 is a simple one in-so-far as only one line was contained in the matrix. Usually there are many lines in the picture and the structures are much more complex. Therefore, if there are more than one line, the same procedure is used in order to find the polar-maxima and their position length and angle.

A multi-line structure leads to a length-vector of the maxima. The lines which give the maxima are named the most significant or the predominant lines and a vector is created which contains only the values greater "0". An example for this is: {123521002463} for a length-vector and {014321004531} for the pertaining angle-vector. This leads to the vectors for the most significant lines: {000500000060} for the length vector and {000300000030} for the angle-vector.

For the predominant lines the "1" of the bit-matrix were added to find these lines. In adding in comparable manner the zeros, the gap-vector is created. This gap vector indicates were the gaps are and the corresponding angle-vector shows the angle of the gap. The procedure to find the gaps is to analyze the position-shifted-polar-matrix for zeros, that means for polar-vectors with a length of "0". This leads to the gap vector and the corresponding angle like shown above, is for example: {−1 −1 −1 −1 −1 −1 0 0 −1 −1 −1 −1} for the gap-vector and {−1 −1 −1 −1 −1 −1 3 4 −1 −1 −1 −1} for the pertaining angle-vector. "−1" means no gap or no hit respectively and "0" means that a gap existis. The sum of all pixels equals 0.

In conclusion it can be stated that basic information can be extracted from the density-matrix as well as from the bit-matrix using the index-shifted-histogram, the polar-maxima, the position-shifted-maxima, the polar-density-vector, the polar-bit-vector, the length-vector, the angle-vector, the start-vector, and the gap-vector. The following should be noted and made be clear: the polar-shift needs not necessary to consider all possible used "aperture" can be linear or can be more complexly shaped. The "aperture" and the rotation can be built by software as well as by hardware or a mixture of both.

In analyzing hand-writing like words or a signature, the above explained method in finding polar maxima and polar minima allows it to find the predominant lines in position. length and angle of such a hand-written signature, These predominant lines are preferably described by vectors in a data string manner. A signature, for example, has typical string pattern, which is given by the arrangement, size and the angle of maximum lines. The same is true for gaps.

An example of the afore-mentioned is shown in connection with a signature of a "K Möller" which is shown in FIG. 6 in hand-written representation. FIG. 6A shows the density matrix of this example of a signature of "K Möller" and FIG. 6B shows the bit matrix of the density matrix shown in FIG. 6A. For producing said bit matrix of FIG. 6B all density values greater than the threshold value "1" are set to be a "1" in the matrix. It should be noted that the sign "–" equals a zero in the density and in the bit matrix.

Figures 7A, 7B, 7C, 7D:
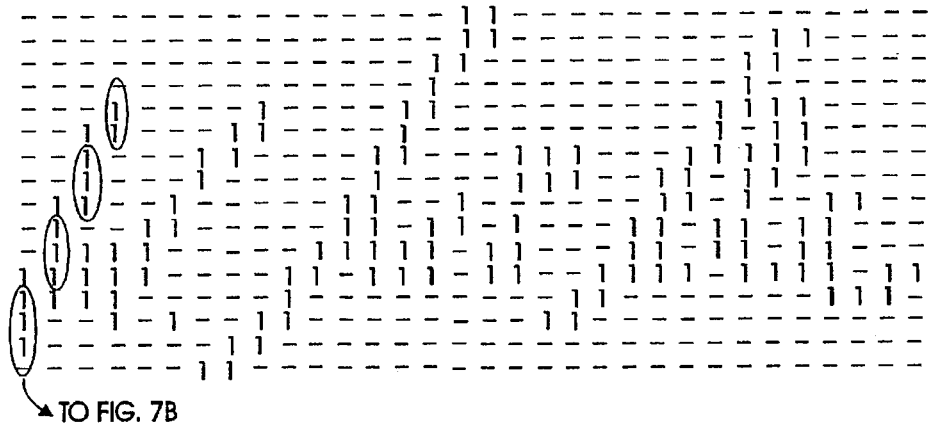
FIG. 7A shows the bit matrix of FIG. 6B.
FIG. 7B shows a position-shifted-polar-matrix pertaining to the bit matrix of FIG. 7A.
FIG. 7C shows the polar length vector derived from the matrix shown in FIG. 7B.
FIG. 7D shows the polar-angle-vector pertaining to the matrix shown in FIG. 7A and 7B.

In FIG. 7A the same bit matrix as in FIG. 6B is shown and in FIG. 7B the position-shifted-polar-matrix pertaining to this bit matrix is depicted. In the left-most column there is indicated by the numbers 0 to 9 the possible shifts for the angle. Encircled in the bit matrix of FIG. 7A is an example of how many bits can be added in the angle in the forth shift by the encircled ones. The result is the encircled 1 in the position-shifted-polar-matrix of FIG. 7B.

FIG. 7C shows the pertaining polar-length-vector and

FIG. 7D the polar-angle-vector pertaining to the respective polar-length-vector shown in FIG. 7 is depicted.

In FIG. 8A to 8C, FIG. 9A to 9C, FIG. 10A to 10C and FIG. 11A to 11C there are shown four more different examples of the bit matrix. In each case it is again the bit matrix of the signature "K Möller" but the versions are different. In the FIGS. denominated with b and c the respective polar-length-vectors and polar-angle-vectors are shown with their respective values. Indicated in the FIGS. denominated with a the predominant lines pertaining to these polar-length-vectors and polar-angle-vectors are shown. As one analyses those predominant lines, one can see that there are six predominant lines more or less arranged in two groups, the left hand group encompasses three lines which do not cross, and there is a right hand group encompassing three lines of which sometimes some if not always at least partly do cross. Furthermore, it can be noted that between the second and the third predominant line from the left there is always a gap. Therefore, although this not in detail shown, gap-vector is a significant basic structure of this signature.

If the predominant lines, as shown in FIGS. 7 to 11, are found and have fulfilled their purpose, one can delete them from the matrix and perform a second iteration using the same method as before. In this second iteration or the second order polar maxima there is found a new set of polar-vectors and built-up a new set of lines, the so-called second order lines.

It is clear that further iterations can be performed to find again a new set of vectors up to the point were all lines are describe or the rest of all lines can be considered by integration and can be described by a value.

The sequence of the steps gives a natural ranking of the importance of the lines in the groups. By this manner a stepwise refinement of the recognition structure is performed. The refinement is stopped by a logical decision or if the procedure has delivered the desired accuracy or if a non-match occurs.

Figure 3:
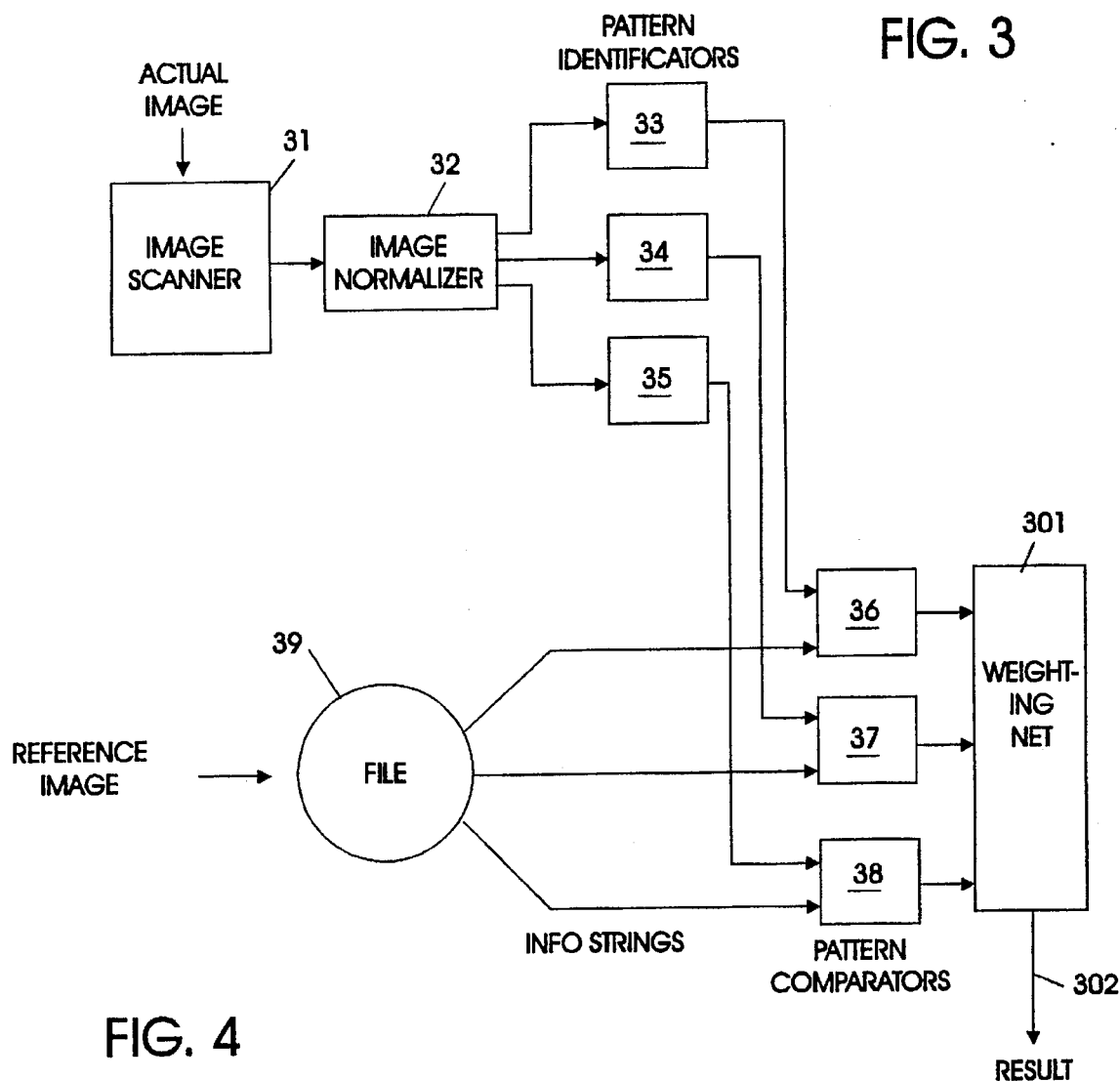
FIG. 3 shows in a schematic block diagram the basic

For the comparison of hand-written text such as words or signatures, the following method is used:

1) The original files of the base structures are established and stored in a reference image file, such as file 39 shown in FIG. 3.

2) The structure to be verified use the same methods to find their significant basic structures.

3) The information strings are compared in the order of significance—this can be performed sequentially or parallel at least for some information entities.

4) The validation of each step is performed and, 5) the results are weighted.

The process delivers decision criterias to stop the comparison if a certain level of confidence is reached or as already said a non-match occurs.

The method of stepwise refinement of the recognition structures, as has been described before on the example of finding predominant lines and an angle structure, can be used in an analogous way for integral methods as histogramming, as finding gravity lines, as analyzing areas with high density, as describing envelopes of line structures or areas and so on.

This method in accordance with the present invention allows to group information in a defined order, allows logical decisions as stopping analyzing process at non-match conditions, or if sufficient validity of the question to be answered is reached. The most predominant basic information can also be used for adjustment.

The result is put in data strings and bit patterns of the strings are describing the characteristics of the recognition structure so that they can be identified. The strings are ranked in order and filed as basic pattern. Certainly do different methods of analyzing lead to different basic structures.

The method proposed by the present invention and demonstrated by the example of polar vectors allows to get a higher efficiency in pattern recognition and validation. This especially in cases of high amount of information and complex structure of images. The method of the invention of stepwise refinement starting with predominant information and then going step by step to information with lower content does this. It uses maximum and minimum analyzes and makes a decision after each step in a true/false mode. It neglects information of minor importance and the quality of information and its weight can be extracted. The process of analyzing is stopped if the desired quality level is reached. The method of the invention can be considered as a method for searching of basic pattern of interest. The weighting is done immediately after each step. Information of no or minor importance is neglected. Thus, in advantageous manner the high amount of information of an image is drastically reduced to the significant information and this significant information is found in a short time and in an effective way.

We claim:

1. A method of pattern recognition and validation, especially of hand-written signatures that are written remote from the place of recognition and validation, using a computer system, and comprising the following steps:

a) scanning a document containing said pattern, b) providing a digital representation of said scanned pattern, especially in the form of a bit matrix, c) determining a predetermined set of characteristics of said pattern, said predetermined characteristics chosen from the set including absolute and relative line and angle structure of selected points and/or lines of said pattern; said step of determining including the steps of:

1) determining the angle structure of lines of said pattern;

2) determining the distribution of said angle structure along an axis of said pattern in the direction of writing, and 3) determining the length of said lines in said angle structure;

4) forming a bit-polar-vector, said vector including an angle vector, a length vector, a start vector, and a gap vector;

d) classifying and validating said determined characteristics by stepwise refinement of the recognition structures, and by selective combination of characteristics with increasing resolution, e) comparing said determined characteristics with a stored set of respective basic structures, and f) repeating step c), d), and e) until a predetermined level of confidence is reached or a non-match occurs.

2. A method of pattern recognition as set forth in claim 1, wherein the step of forming the bit-polar-vector includes using a shift technique.

3. A method of pattern recognition as set forth in claim 2, wherein the step of using a shift technique comprises generating a linear index shift density matrix by rotating stepwise an aperture, measuring the density of the image in the aperture, and then shifting the aperture stepwise across the image of the pattern.

4. A method of pattern recognition as set forth claim 3, wherein step of rotating said aperture includes rotating a linear aperture.

5. A method of pattern recognition as set forth in claim 3 wherein the step of rotating said aperture is accomplished at least partially by a software algorithm.

6. A method of pattern recognition and validation, especially of hand-written signatures that are written remote from the place of recognition and validation, using a computer system, and comprising the following steps:

a) scanning a document containing said pattern, b) providing a digital representation of said scanned pattern, especially in the form of a bit matrix, c) normalizing of a scanned image in the process with the steps of:

1) defining a direction of writing substantially horizontal as the X-axis, 2) determining in an angle analysis the angle between a "vertical" direction of the written lines and said horizontal axis, and 3) shifting the image matrix in the opposite direction of said determined angle by the determined angle between the vertical direction of the written lines and said horizontal axis as determined by step 2) above, d) determining a predetermined set of characteristics of said pattern, said predetermined characteristics chosen from the set including absolute and relative line and angle structure of selected points and/or lines of said pattern;

e) classifying and validating said determined characteristics by stepwise refinement of the recognition structures, and by selective combination of characteristics with increasing resolution, f) comparing said determined characteristics with a stored set of respective basic structures and g) repeating steps c), d), e), and f) until a predetermined level of confidence is reached or a non-match occurs.

7. A method of pattern recognition as set forth in claim 6, wherein the method includes the step of transforming said histogram into a bit matrix, by setting all density values of the density matrix greater than a defined threshold value to a "1" and all other values to a "0".

* * * * *